UNITED STATES PATENT OFFICE.

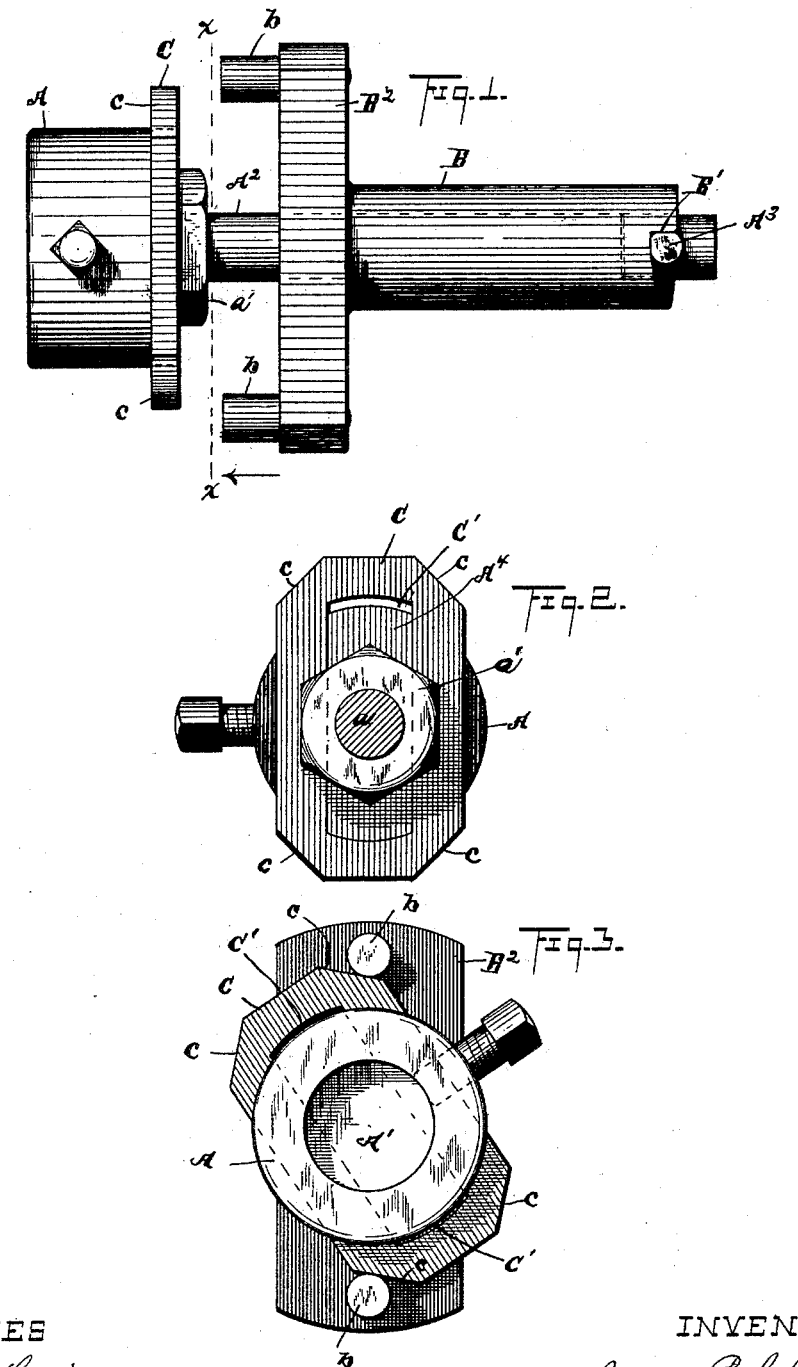

JAMES B. CLYNE, OF CLEVELAND, OHIO, ASSIGNOR TO THE CLEVELAND MACHINE SCREW COMPANY, OF SAME PLACE.

DIE OR TAP HOLDER FOR SCREW-MACHINES.

SPECIFICATION forming part of Letters Patent No. 497,767, dated May 23, 1893.

Application filed January 7, 1893. Serial No. 457,696. (No model.)

*To all whom it may concern:*

Be it known that I, JAMES B. CLYNE, of Cleveland, in the county of Cuyahoga and State of Ohio, have invented certain new and useful Improvements in Die or Tap Holders for Screw-Machines; and I do hereby declare the following to be a full, clear, and exact description of the invention, such as will enable others skilled in the art to which it pertains to make and use the same.

My invention relates to improvements in die or tap holders for screw machines and more especially to a self adjusting driving plate by means of which the two driving pins that transmit power to the holder are caused to engage with equal force diagonally opposite corners of the driving plate, whereby is avoided any vibratory tendency of the holder in transmitting the motive power thereto.

In the accompanying drawings: Figure 1 is a side elevation of a device embodying my invention. Fig. 2 is an elevation in transverse section taken on line $x\ x$, Fig. 1. Fig. 3 is a front or left hand elevation.

A, represents the holder, the forward end of which is provided with a central bore as at A', in which bore may be inserted a screw threading die or the shank of a screw-threading tap.

B, is the driver, the same having a central bore in which bore operates, with an easy fit, the spindle $A^2$, of the holder. The rear end of the driver is scroll or cam shaped, having a shoulder at B', and spindle $A^2$, has a laterally projecting pin $A^3$, for engaging shoulder B'.

$B^2$, is the cross head of the driver and this cross head is provided with two driving pins $b\ b$, these pins projecting forward and being located equi-distant from the axis of the driver and diametrically opposite each other. The rearward end of the holder is flattened as shown in Fig. 3, leaving an oblong central section $A^4$, the sides of which are parallel with each other.

C, is the driving plate, the same having a slot C', adapted to receive member $A^4$ with an easy fit. This slot is a little longer than member $A^4$, so that plate C may slide endwise a limited distance for purpose of self adjustment. The four corners of plate C are correspondingly beveled as at c. An enlarged section a, of spindle $A^2$, is screw-threaded to receive nut a', by means of which nut, plate C is held to its seat. The blank is supposed to be held in the chuck of a mandrel (not shown) the rotation of which mandrel is supposed to be reversible. The driver is supposed to be affixed to a stock (not shown) such stock having end movement toward and from the blank, but the driver does not turn on its axis.

I will remark that the device substantially as shown, except plate C and its seat and securing nut, is well known and hence the operations thereof need not be further described.

Heretofore the holder was provided with one or two rearwardly projecting pins for engaging the pins of the driver. If the holder had but one pin, the power was consequently applied at the one side of the center of motion, and with such construction the tendency, in heavy work, was to cause the holder to vibrate, and any vibration or lateral deflection of the holder, is objectionable, in that it injures the work. The difficulty could be overcome by providing the holder with two pins arranged to simultaneously engage the two pins of the driver with equal force; but this involved much skill and great care in locating the pins with accuracy required, and even when so located, the pins would not always wear alike.

In view of the foregoing, I have devised the driving plate C, arranged as hereinbefore described, whereby if one pin engages the plate before the other pin, such engagement will move the plate endwise, thus causing the two pins to engage diagonally opposite corners of the plate with equal force, by means of which there is no tendency to vibrate or deflect the holder in applying the motive power thereto from the driver, and such equalizing action of the plate will accrue with the mandrel revolving in either direction.

It will be understood that my improved die or tap holder being a tool holder complete in itself, the member B may be rigidly fixed in one of the holes of the turret of a turret lathe, or said member B may be attached to the tool post of an ordinary lathe.

What I claim is—

The combination with a holder for a screw-threading tap or die of a driver for the same the holder having an axial spindle journaled and having end play in the axial bore of the driver, said driver having pins projecting toward the holder and the holder having a lateral endwise adjustable driving plate and having beveled corners for engaging the pins of the driver, substantially as described and set forth.

In testimony whereof I sign this specification, in the presence of two witnesses, this 3d day of January, 1893.

JAMES B. CLYNE.

Witnesses:
W. T. WHITE,
C. M. PRYSE.